(12) United States Patent
Gallagher et al.

(10) Patent No.: US 11,118,459 B2
(45) Date of Patent: Sep. 14, 2021

(54) TURBOFAN ARRANGEMENT WITH BLADE CHANNEL VARIATIONS

(71) Applicant: United Technologies Corporation, Farmington, CT (US)

(72) Inventors: Edward J. Gallagher, West Hartford, CT (US); Sue-Li Chuang, Glastonbury, CT (US)

(73) Assignee: AYTHEON TECHNOLOGIES CORPORATION, Farmington, CT (US)

( * ) Notice: Subject to any disclaimer, the term of this patent is extended or adjusted under 35 U.S.C. 154(b) by 260 days.

(21) Appl. No.: 16/519,475

(22) Filed: Jul. 23, 2019

(65) Prior Publication Data

US 2020/0102830 A1    Apr. 2, 2020

Related U.S. Application Data

(63) Continuation of application No. 15/045,343, filed on Feb. 17, 2016, now Pat. No. 10,358,924, which is a
(Continued)

(51) Int. Cl.
*F01D 5/14* (2006.01)
*F04D 29/32* (2006.01)
(Continued)

(52) U.S. Cl.
CPC ............... *F01D 5/14* (2013.01); *F01D 5/141* (2013.01); *F02C 3/10* (2013.01); *F04D 29/32* (2013.01);
(Continued)

(58) Field of Classification Search
CPC ... F01D 5/14; F01D 5/141; F02C 3/10; F04D 29/32; F04D 29/324; F04D 29/325; F04D 29/384; F05D 2220/36; F05D 2220/70
See application file for complete search history.

(56) References Cited

U.S. PATENT DOCUMENTS 2,258,792 A  4/1941 New
2,936,655 A  5/1960 Peterson et al.
(Continued)

FOREIGN PATENT DOCUMENTS

EP  0791383  8/1997
EP  1111188  6/2001
(Continued)

OTHER PUBLICATIONS

Honeywell LF507. Jane's Aero-engines, Aero-engines—Turbofan. Feb. 9, 2012.
(Continued)

*Primary Examiner* — Woody A Lee, Jr.
*Assistant Examiner* — Brian O Peters
(74) *Attorney, Agent, or Firm* — Carlson, Gaskey & Olds, P.C.

(57) ABSTRACT

A gas turbine engine according to an example of the present disclosure includes, among other things, a fan section having a fan including a rotor hub rotatable about an engine longitudinal axis and an array of fan blades, a geared architecture, a compressor section including a low pressure compressor and a high pressure compressor, a turbine section including a low pressure turbine and a high pressure turbine. The low pressure turbine drives the fan through the geared architecture. Each fan blade of the array of fan blades includes pressure and suction sides and extending in a radial direction from a 0% span position at an inner flow path location to a 100% span position at an airfoil tip, and facing pressure and suction sides of adjacent fan blades define a channel in a chordwise direction having a width between the facing pressure and suction sides at a given span position of the adjacent fan blades. The width at each pressure side location along the channel is defined as a minimum distance
(Continued)

to a location along the suction side, and the width converges along the channel for at least some span positions.

30 Claims, 7 Drawing Sheets

Related U.S. Application Data continuation of application No. 14/699,322, filed on Apr. 29, 2015, now Pat. No. 9,470,093.

(60) Provisional application No. 62/134,760, filed on Mar. 18, 2015.

(51) Int. Cl.
  *F02C 3/10* (2006.01)
  *F04D 29/38* (2006.01)

(52) U.S. Cl.
  CPC ......... *F04D 29/324* (2013.01); *F04D 29/325* (2013.01); *F04D 29/384* (2013.01); *F05D 2220/36* (2013.01); *F05D 2250/70* (2013.01); *Y02T 50/60* (2013.01)

(56) References Cited

U.S. PATENT DOCUMENTS

| | | | |
|---|---|---|---|
| 3,021,731 A | 2/1962 | Stoeckicht | |
| 3,194,487 A | 7/1965 | Tyler et al. | |
| 3,287,906 A | 11/1966 | McCormick | |
| 3,352,178 A | 11/1967 | Lindgren et al. | |
| 3,412,560 A | 11/1968 | Gaubatz | |
| 3,468,473 A | 9/1969 | Chilman | |
| 3,664,612 A | 5/1972 | Skidmore et al. | |
| 3,747,343 A | 7/1973 | Rosen | |
| 3,754,484 A | 8/1973 | Roberts | |
| 3,820,719 A | 6/1974 | Clark | |
| 3,892,358 A | 7/1975 | Gisslen | |
| 3,932,058 A | 1/1976 | Hamer et al. | |
| 3,935,558 A | 1/1976 | Miller et al. | |
| 3,988,889 A | 11/1976 | Chamay et al. | |
| 4,130,872 A | 12/1978 | Harloff | |
| 4,284,174 A | 8/1981 | Salvana et al. | |
| 4,289,360 A | 9/1981 | Zirin | |
| 4,478,551 A | 10/1984 | Honeycutt, Jr. et al. | |
| 4,649,114 A | 3/1987 | Miltenburger et al. | |
| 4,682,935 A | 7/1987 | Martin | |
| 4,696,156 A | 9/1987 | Burr et al. | |
| 4,979,362 A | 12/1990 | Vershure, Jr. | |
| 5,102,379 A | 4/1992 | Pagluica et al. | |
| 5,141,400 A | 8/1992 | Murphy et al. | |
| 5,167,489 A | 12/1992 | Wadia et al. | |
| 5,169,288 A | 12/1992 | Gliebe et al. | |
| 5,205,712 A | 4/1993 | Hamilton | |
| 5,317,877 A | 6/1994 | Stuart | |
| 5,342,170 A * | 8/1994 | Elvekjaer | F01D 5/142 |
| | | | 415/192 |
| 5,361,580 A | 11/1994 | Ciokajlo et al. | |
| 5,433,674 A | 7/1995 | Sheridan et al. | |
| 5,447,411 A | 9/1995 | Curley et al. | |
| 5,466,198 A | 11/1995 | McKibbin et al. | |
| 5,524,847 A | 6/1996 | Brodell et al. | |
| 5,634,767 A | 6/1997 | Dawson | |
| 5,677,060 A | 10/1997 | Terentieva et al. | |
| 5,769,607 A | 6/1998 | Neely et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 5,980,209 A * | 11/1999 | Barry | F01D 5/187 |
| | | | 416/223 A |
| 5,985,470 A | 11/1999 | Spitsberg et al. | |
| 6,004,095 A | 12/1999 | Waitz et al. | |
| 6,195,983 B1 | 3/2001 | Wadia et al. | |
| 6,223,616 B1 | 5/2001 | Sheridan | |
| 6,315,815 B1 | 11/2001 | Spadaccini et al. | |
| 6,318,070 B1 | 11/2001 | Rey et al. | |
| 6,328,533 B1 | 12/2001 | Decker | |
| 6,338,609 B1 | 1/2002 | Decker | |
| 6,387,456 B1 | 5/2002 | Eaton, Jr. et al. | |
| 6,398,489 B1 * | 6/2002 | Burdgick | F01D 5/141 |
| | | | 415/115 |
| 6,517,341 B1 | 2/2003 | Brun et al. | |
| 6,561,761 B1 | 5/2003 | Decker et al. | |
| 6,607,165 B1 | 8/2003 | Manteiga et al. | |
| 6,709,239 B2 * | 3/2004 | Chandraker | F01D 5/141 |
| | | | 416/238 |
| 6,709,492 B1 | 3/2004 | Spadaccini et al. | |
| 6,814,541 B2 | 11/2004 | Evans et al. | |
| 6,883,303 B1 | 4/2005 | Seda | |
| 7,021,042 B2 | 4/2006 | Law | |
| 7,107,756 B2 | 9/2006 | Rolt | |
| 7,219,490 B2 | 1/2007 | Dev | |
| 7,328,580 B2 | 2/2008 | Lee et al. | |
| 7,374,403 B2 | 5/2008 | Decker et al. | |
| 7,591,754 B2 | 9/2009 | Duong et al. | |
| 7,632,064 B2 | 12/2009 | Somanath | |
| 7,662,059 B2 | 2/2010 | McCune | |
| 7,758,306 B2 | 7/2010 | Burton et al. | |
| 7,770,377 B2 | 8/2010 | Rolt | |
| 7,806,651 B2 | 10/2010 | Kennepohl et al. | |
| 7,824,305 B2 | 11/2010 | Duong et al. | |
| 7,828,682 B2 | 11/2010 | Smook | |
| 7,882,691 B2 | 2/2011 | Lemmers et al. | |
| 7,926,260 B2 | 4/2011 | Sheridan et al. | |
| 7,997,868 B1 | 8/2011 | Liang et al. | |
| 7,997,872 B2 | 8/2011 | Wilson | |
| 7,997,882 B2 | 8/2011 | Shulver | |
| 8,205,432 B2 | 6/2012 | Sheridan | |
| 8,667,775 B1 | 3/2014 | Kisska et al. | |
| 9,121,368 B2 | 9/2015 | Gallagher et al. | |
| 9,206,766 B2 | 12/2015 | Clemen | |
| 2006/0228206 A1 | 10/2006 | Decker et al. | |
| 2007/0160478 A1 | 7/2007 | Jarrah et al. | |
| 2008/0003096 A1 | 1/2008 | Kohli et al. | |
| 2008/0095633 A1 | 4/2008 | Wilson | |
| 2008/0116009 A1 | 5/2008 | Sheridan et al. | |
| 2008/0155961 A1 | 7/2008 | Johnson | |
| 2008/0226454 A1 * | 9/2008 | Decker | F04D 29/384 |
| | | | 416/203 |
| 2008/0317588 A1 | 12/2008 | Grabowski et al. | |
| 2009/0056343 A1 | 3/2009 | Suciu et al. | |
| 2009/0074565 A1 | 3/2009 | Suciu et al. | |
| 2009/0314881 A1 | 12/2009 | Suciu et al. | |
| 2010/0089019 A1 | 4/2010 | Knight et al. | |
| 2010/0105516 A1 | 4/2010 | Sheridan et al. | |
| 2010/0148396 A1 | 6/2010 | Xie et al. | |
| 2010/0162683 A1 | 7/2010 | Grabowski et al. | |
| 2010/0212281 A1 | 8/2010 | Sheridan | |
| 2010/0218483 A1 | 9/2010 | Smith | |
| 2010/0260609 A1 | 10/2010 | Wood et al. | |
| 2010/0331139 A1 | 12/2010 | McCune | |
| 2011/0159797 A1 | 6/2011 | Beltman et al. | |
| 2011/0293423 A1 | 12/2011 | Bunker et al. | |
| 2012/0124964 A1 | 5/2012 | Hasel et al. | |
| 2013/0340406 A1 * | 12/2013 | Gallagher | F01D 5/141 |
| | | | 60/204 |

FOREIGN PATENT DOCUMENTS

| | | |
|---|---|---|
| EP | 1142850 | 10/2001 |
| EP | 1712738 | 10/2006 |
| EP | 2543867 | 1/2013 |
| GB | 1516041 | 6/1978 |
| GB | 2041090 | 9/1980 |
| GB | 2426792 | 12/2006 |

(56) References Cited

FOREIGN PATENT DOCUMENTS

| | | |
|---|---|---|
| GB | 2431697 | 5/2007 |
| WO | 2007038674 | 4/2007 |

OTHER PUBLICATIONS

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8). Start p. 32.

Hendricks, E.S. and Tong, M.T. (2012). Performance and weight estimates for an advanced open rotor engine. NASA/TM-2012-217710. pp. 1-13.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Zalud, T. (1998). Gears put a new spin on turbofan performance. Machine Design, 70(20), p. 104.

Kurzke, J. (2008). Preliminary Design, Aero-engine design: From state of the art turbofans towards innovative architectures. pp. 1-72.

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.

Han, J., Dutta, S., and Ekkad, S.V. (2000). Gas turbine heat transfer and cooling technology. New York, NY: Taylor & Francis. pp. 1-25, 129-157, and 160-249.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.

Declaration of Reza Abhari, Ph.D. In re U.S. Pat. No. 8,844,265. Executed Jun. 28, 2016. pp. 1-91.

Declaration of John Eaton, Ph.D. In re U.S. Pat. No. 8,869,568. Executed Mar. 28, 2016. pp. 1-87.

Declaration of Reza Abhari. In re U.S. Pat. No. 8,695,920. Executed Nov. 30. pp. 1-67.

Declaration of Reza Abhari. In re U.S. Pat. No. 8,448,895. Executed Nov. 28. pp. 1-81.

Declaration of Reza Abhari. In re U.S. Pat. No. 8,695,920, claims 1-4, 7-14, 17 and 19. Executed Nov. 29. pp. 1-102.

Declaration of Dr. Magdy Attia. In re U.S. Pat. No. 8,313,280. Executed Oct. 21, 2016. pp. 1-88.

Lord, W.K., Macmartin, D.G., and Tillman, T.G. (2000). Flow control opportunities in gas turbine engines. American Institute of Aeronautics and Astronautics. pp. 1-15.

Roux, E. (2007). Turbofan and turbojet engines database handbook. Editions Elodie Roux. Blagnac: France. pp. 1-595.

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Declaration of Dr. Magdy Attia. In re U.S. Pat. No. 8,517,668. Executed Dec. 8, 2016. pp. 1-81.

Cramoisi, G. Ed. (2012). Death in the Potomac: The crash of Air Florida Flight 90. Air Crash Investigations. Accident Report NTSB/AAR-82-8. p. 45-47.

Norton, M. and Karczub, D. (2003). Fundamentals of noise and vibration analysis for engineers. Press Syndicate of the University of Cambridge. New York: New York. p. 524.

U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.

U.S. Department of Transportation: Federal Aviation Administration Advisory Circular. Standard operating procedures for flight deck crewmembers. Dated: Feb. 27, 2003.. p. 1-6 and Appendices.

Vasudevan, A.K. and Petrovic, J.J. (1992). A comparative overview of molybedenum disilicide composites. Materials Science and Engineering, A155, 1992. pp. 1-17.

Clarke, D.R. and Levi, C.G. (2003). Materials design for the next generation thermal barrier coatings. Annual. Rev. Mater. Res. vol. 33. 2003. pp. 383-417.

Lee, K.N. (2000). Current status of environmental barrier coatings for Si-Based ceramics. Surface and Coatings Technology 133-134, 2000. pp. 1-7.

Bornstein, N. (1993). Oxidation of advanced intermetallic compound& Journal de Physique IV, 1993, 03 (C9), pp. C9-367-C9-373.

Krenkel, W., Naslain, R., and Schneider, H. Eds. (2001). High temperature ceramic matrix composites pp. 224-229. Weinheim, DE: Wiley-VCH Verlag GmbH.

Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.

Shah, D.M. (1992). MoSi2 and other silicides as high temperature structural materials. Superalloys 1992. The Minerals, Metals, & Materials Society. pp. 409-422.

Zhao, J.C. and Westbrook, J.H. (2003). Ultrahigh-temperature materials for jet engines. MRS Bulletin. vol. 28(9). Sep. 2003. pp. 622-630.

Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.

Jacobson, N.S. (1993). Corrosion of silicon-based ceramics in combustion environments. J. Am. Ceram. Soc. 76(1). pp. 3-28.

Jorgensen, P.J., Wadsworth, M.E., and Cutler, I.B. (1961). Effects of water vapor on oxidation of silicon carbide. J. Am. Ceram. Soc. 44(6). pp. 248-261.

Xu, Y., Cheng, L., Zhang, L., Ying, H., and Zhou, W. (1999). Oxidation behavior and mechanical properties of a C/SiC composites with Si—MoSi2 oxidation protection coating. J. of Mat. Sci. vol. 34. 1999. pp. 6009-6014.

Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.

Jeng, Y.-L., Lavernia, E.J. (1994). Processing of molybdenum disilicide. J. of Mat. Sci. vol. 29. 1994. pp. 2557-2571.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.

Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.

Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Muhlstein, C.L, Stach, E.A, and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Leckie, F.A. and Dal Bello, D.J. (2009). Strength and stiffness of engineering systems. Mechanical Engineering Series. Springer. pp. 1-3.

(56) References Cited

OTHER PUBLICATIONS

El-Sayad, A.F. (2008). Aircraft propulsion and gas turbine engines. Boca Raton, FL: CRC Press. pp. 215-219 and 855-860.

Bunker, R.S. (2005). A review of shaped hole turbine film-cooling technology. Journal of Heat Transfer vol. 127. Apr. 2005. pp. 441-453.

Video. Leap engine—Composite Fan Blades & Case. Published to YouTube Sep. 19, 2013. URL: https://www.youtube.com/watch?v=mX6N8koZxXg.

Video. How does an engine work. Published to YouTube Jan. 27, 2014. URL: https://www.youtube.com/watch?v=kz5kv0RfeUc.

Image. LEAP-1A angled cutaway. Retrieved Apr. 1, 2014 from http://www.geaviation.com/manufacturing/CFM-LEAP.html.

Image. LEAP-1A cutaway image. Retrieved Mar. 31, 2014 from http://www.geaviation.com/manufacturing/CFM-LEAP.html.

GE Aviation. CFM LEAP: the world's fastest-selling engine. Retrieved Mar. 26, 2014 from http://www.geaviation.com/manufacturing/CFM-LEAP.html.

Petition for Inter Partes Review of U.S. Pat. No. 9,121,412. *General Electric Company*, Petitioner, v. *United Technologies Corporation*, Patent Owner. IPR2017-00431. Filed Apr. 25, 2016.

Petition for Inter Partes Review of U.S. Pat. No. 9,121,368. *General Electric Company*, Petitioner, v. *United. Technologies Corporation*, Patent Owner. IPR2018-01123. Filed May 18, 2018.

Declaration of Magdy Attia. In re U.S. Pat. No. 9,121,368. IPR2018-01123. Executed May 17, 2018. pp. 1-89.

Partial European Search Report for European Patent Application No. 16161120 completed Jul. 19, 2016.

European Search Report for European Patent Application No. 16161120 completed Nov. 15, 2016.

European Search Report for European Patent Application No. 18200821.9 completed Jan. 29, 2019.

Winn, A. (Ed). (1990). Wide Chord Fan Club. Flight International, 4217(137). May 23-29, 1990. pp. 34-38.

Parker, R.G. and Lin, J. (2001). Modeling, modal properties, and mesh stiffness variation instabilities of planetary gears. Prepared for NASA. NASA/CR-2001-210939. May 2001. pp. 1-111.

Mancuso, J.R. and Corcoran, J.P. (2003). What are the differences in high performance flexible couplings for turbomachinery? Proceedings of the Thirty-Second Turbomachinery Symposium. 2003. pp. 189-207.

Dudley, D.W., Ed. (1954). Handbook of practical gear design. Lancaster, PA: Technomic Publishing Company, Inc. pp. 3.96-3.102 and 8.12-8.18.

Dudley, D.W., Ed. (1962). Gear handbook. New York, NY: McGraw-Hill. pp. 3.14-3.18 and 12.7-12.21.

Dudley, D.W., Ed. (1994). Practical gear design. New York, NY: McGraw-Hill. pp. 119-124.

Product Brochure. Garrett TFE731. Allied Signal. Copyright 1987. pp. 1-24.

Honeywell Learjet 31 and 35/36 TFE731-2 to 2C Engine Upgrade Program. Sep. 2005. pp. 1-4.

Honeywell Sabreliner 65 TFE731-3 to -3D Engine Upgrade Program. Oct. 2005. pp. 1-4.

U.S. Department of Transportation: Federal Aviation Administration Type Certificate Data Sheet No. E6WE. Dated: May 9, 2000. p. 1.

Kurzke, J. (2012). GasTurb 12: Design and off-design performance of gas turbines. Retrieved from: https://www.scribd.com/document/153900429/GasTurb-12.

Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.

Riegler, C., and Bichlmaier, C. (2007). The geared turbofan technology—Opportunities, challenges and readiness status. Porceedings CEAS. Sep. 10-13, 2007. Berlin, Germany. pp. 1-12.

About GasTurb. Retrieved Jun. 26, 2018 from: http://gasturb.de/about-gasturb.html.

Kurzke, J. (2001). GasTurb 9: A program to calculate design and off-design performance of gas turbines. Retrieved from: https://www.scribd.com/document/92384867/GasTurb9Manual.

Tummers, B. (2006). DataThief III. Retreived from: https://datathief.org/DatathiefManual.pdf pp. 1-52.

Manual. Student's Guide to Learning SolidWorks Software. Dassault Systemes—SolidWorks Corporation. pp. 1-156.

Macisaac, B. and Langston, R. (2011). Gas turbine propulsion systems. Chichester, West Sussex: John Wiley & Sons, Ltd. pp. 260-265.

Datasheet. CFM56-5B for the Airbus A320ceo family and CFM56-7B for the Boeing 737 family. https://www.cfmaeroengines.com/.

Turner, M. G., Norris, A., and Veres, J.P. (2004). High-fidelity three-dimensional simulation of the GE90. NASA/TM-2004-212981. pp. 1-18.

Defeo, A. and Kulina, M. (1977). Quiet clean short-haul experimental engine (QCSEE) main reduction gears detailed design final report. Prepared for NASA. NASA-CR-134872. Jul. 1977. pp. 1-221.

Amezketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.

Singh, A. (2005). Application of a system level model to study the planetary load sharing behavior. Jounal of Mechanical Design. vol. 127. May 2005. pp. 469-476.

Smith-Boyd, L. and Pike, J. (1986). Expansion of epicyclic gear dynamic analysis program. Prepared for NASA. NASA CR-179563. Aug. 1986. pp. 1-98.

Wikipedia. Torsion spring. Retreived Jun. 29, 2018 from: https://en.wikipedia.org/wiki/Torsion_spring.

AGMA Standard (2006). Design manual for enclosed epicyclic gear drives. Alexandria, VA: American Gear Manufacturers Association. pp. 1-104.

AGMA Standard (1997). Design and selection of components for enclosed gear drives. lexandria, VA: American Gear Manufacturers Association. pp. 1-48.

Daly, M. Ed. (2007). Jane's Aero-Engine. Issue Twenty-three. Mar. 2008. p. 707-12.

AGMA Standard (1999). Flexible couplings—Mass elastic properties and other characteristics. Alexandria, VA: American Gear Manufacturers Association. pp. 1-46.

Wikipedia. Stiffness. Retreived Jun. 28, 2018 from: https://en.wikipedia.orgiwiki/Stiffness.

Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of gears.

Hill, P.G., Peterson, C.R. (1965). Mechanics and thermodynamics of propulsion. Addison-Wesley Publishing Company, Inc. pp. 307-308.

Hill, P.G., Peterson, C.R. (1992). Mechanics and thermodynamics of propulsion, 2nd Edition. Addison-Wesley Publishing Company, Inc. pp. 400-406.

Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.

Gray, D.E. and Gardner, W.B. (1983). Energy efficient engine program technology benefit/cost study—vol. 2. NASA CR-174766. Oct. 1983. pp. 1-118.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

(56) References Cited

OTHER PUBLICATIONS

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers, 108(8), 65-67.

Faghri, A. (1995). Heat pipe and science technology. Washington, D.C.: Taylor & Francis. pp. 1-60.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, fith Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Middleton, P. (1971). 614: VFW's jet feederliner. Flight International, Nov. 4, 1971. p. 725, 729-732.

Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-31.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

Baker, R.W. (2000). Membrane technology and applications. New York, NY: McGraw-Hill. pp. 87-153.

Cheryan, M. (1998). Ultrafiltration and microfiltration handbook. Lancaster, PA: Tecnomic Publishing Company, Inc. pp. 171-236.

Seader, J.D. and Henley, E.J. (1998). Separation process principles. New York, NY: John Wiley & Sons, Inc. pp. 122-126 and 764-771.

Spadaccini, L.J., and Huang, H. (2002). On-line fuel deoxygenation for coke suppression. ASME, Jun. 2002. pp. 1-7.

Darrah, S. (1987). Jet fuel deoxygenation. Interim Report for Period Mar. 1987-Jul. 1988. pp. 1-22.

Bucknell, R.L. (1973). Influence of fuels and lubricants on turbine engine design and performance, fuel and lubricant analyses. Final Technical Report, Mar. 1971-Mar. 1973. pp. 1-252.

Hazlett, R.N. (1991). Thermal oxidation stability of aviation turbine fuels. Philadelphia, PA: ASTM. pp. 1-163.

Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.

Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.

Hemighaus, G., Boval, T., Bacha, J., Barnes, F., Franklin, M., Gibbs, L., . . . Morris, J. (2007). Aviation fuels: Technical review. Chevron

(56) References Cited

OTHER PUBLICATIONS

Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_pffe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, JR., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Thulin, R.D., Howe, D.C., and Singer, I.D. (1982). Energy efficient engine: High pressure turbine detailed design report. Prepared for NASA. NASA CR-165608. pp. 1-178.

Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Gray, D.E. (1978). Energy efficient engine preliminary design and integration studies. Prepared for NASA. NASA CR-135396. Nov. 1978. pp. 1-366.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
Datasheet. CF6-80C2 high-bypass turbofan engines. Retrieved from https://geaviation.com/sites/default/files/datasheet-CF6-80C2.pdf.
Salemme, C.T. and Murphy, G.C. (1979). Metal spar/superhybrid shell composite fan blades. Prepared for NASA. NASA-CR-159594. Aug. 1979. pp. 1-127.
"Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".
Datasheet. Genx™ high bypass turbofan engines. Retreived from: https://www.geaviation.com/sites/default/files/datasheet-genx.pdf.
2003 NASA seal/secondary air system workshop. (2003). NASA/CP-2004-212963/VOL1. Sep. 1, 2004. pp. 1-408.
Berton, J.J. and Guynn, M.D. (2012). Multi-objective optimization of a turbofan for an advanced, single-aisle transport. NASA/TM-2012-217428. pp. 1-26.
Chapman, J.W. and Litt, J.S. (2017). Control design for an advanced geared turbofan engine. AIAA Joint Propulsion Conference 2017. Jul. 10, 2017-Jul. 12, 2017. Atlanta, GA. pp. 1-12.
Dalton, III., W.N. (2003). Ultra high bypass ratio low noise engine study. NASA/CR-2003-212523. Nov. 2003. pp. 1-187.
Edkins, D.P., Hirschkron, R., and Lee, R. (1972). TF34 turbofan quiet engine study. Final Report prepared for NASA. NASA-CR-120914. Jan. 1, 1972. pp. 1-99.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/VOL1. pp. 1-187.
Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.
Guynn, M.D., Berton, J.J., Fisher, K.L., Haller, W.J., Tong, M. T., and Thurman, D.R. (2009). Analysis of turbofan design options for an advanced single-aisle transport aircraft. American Institute of Aeronautics and Astronautics. pp. 1-13.
Mavris, D.N., Schutte, J.S. (2016). Application of deterministic and probabilistic system design methods and enhancements of conceptual design tools for ERA project final report. NASA/CR-2016-219201. May 1, 2016. pp. 1-240.
McCracken, R.C. (1979). Quiet short-haul research aircraft familiarization document. NASA-TM-81149. Nov. 1, 1979. pp. 1-76.

(56) References Cited

OTHER PUBLICATIONS

Litt, J.S. (2018). Sixth NASA Glenn Research Center propulsion control and diagnostics (PCD) workshop. NASA/CP-2018-219891. Apr. 1, 2018. pp. 1-403.
Rotordynamic instability problems in high-performance turbomachinery. (1986). NASA conference publication 2443. Jun. 2-4, 1986.
Sargisson, D.F. (1985). Advanced propfan engine technology (APET) and single-rotation gearbox/pitch change mechanism. NASA Contractor Report-168113. R83AEB592. Jun. 1, 1985. pp. 1-476.
Singh, R. and Houser, D.R. (1990). Non-linear dynamic analysis of geared systems. NASA-CR-180495. Feb. 1, 1990. pp. 1-263.
Smith, C.E, Hirschkron, R., and Warren, R.E. (1981). Propulsion system study for small transport aircraft technology (STAT). Final report. NASA-CR-165330. May 1, 1981. pp. 1-216.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.
Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.
Bloomer, H.E. and Samanich, N.E. (1982). QCSEE under-the-wing engine acoustic data. NASA-TM-82691. May 1, 1982. pp. 1-28.
Bloomer, H.E. and Loeffler, I.J. (1982). QCSEE over-the-wing engine acoustic data. NASA-TM-82708. May 1, 1982. pp. 1-558.
Bloomer, H.E. and Samanich, N.E. (1982). QCSEE under-the-wing enging-wing-flap aerodynamic profile characteristics. NASA-TM-82890. Sep. 1, 1982. pp. 1-48.
Howard, D.F. (1976). QCSEE preliminary under the wing flight propulsion system analysis report. NASACR-134868. Feb. 1, 1976. pp. 1-260.
Misel, O.W. (1977). QCSEE main reduction gears test program. NASA CR-134669. Mar. 1, 1977. pp. 1-222.
QCSEE Preliminary analyses and design report. vol. 1. (1974). NASA-CR-134838. Oct. 1, 1974. pp. 1-337.
QCSEE preliminary analyses and design report. vol. II. (1974). NASA-CR-134839. Oct. 1, 1974. pp. 340-630.
QCSEE under-the-wing engine composite fan blade design. (1975). NASA-CR-134840. May 1, 1975. pp. 1-51.
DCSEE the aerodynamic and preliminary mechanical design of the QCSEE OTW fan. (1975). NASA-CR-134841. Feb. 1, 1975. pp. 1-74.
QCSEE under-the-wing engine composite fan blade preliminary design test report. (1975). NASA-CR-134846. Sep. 1, 1975. pp. 1-56.
QCSEE over-the-wing final design report (1977). NASA-CR-134848. Jun. 1, 1977. pp. 1-503.
QCSEE hamilton standard cam/harmonic drive variable pitch fan actuation system derail design report. (1976). NASA-CR-134852. Mar. 1, 1976. pp. 1-172.
QCSEE main reduction gears bearing development program final report. (1975). NASA-CR-134890. Dec. 1, 1975. pp. 1-41.
QCSEE under-the-wing engine digital control system design report. (1978). NASA-CR-134920. Jan. 1, 1978. pp. 1-309.
QCSEE the aerodynamic and mechanical design of the QCSEE under-the-wing fan. (1977). NASA-CR-135009. Mar. 1, 1977. pp. 1-137.
OCSEE under-the-wing engine composite fan blade final design test report. (1977). NASA-CR-135046. Feb. 1, 1977. pp. 1-55.
QCSEE over-the-wing propulsion system test report vol. III—mechanical performance. (1978). NASA-CR-135325. Feb. 1, 1978. pp. 1-112.
QCSEE ball spline pitch-change mechanism whirligig test report. (1978). NASA-CR-135354. Sep. 1, 1978. pp. 1-57.
Quiet clean general aviation turbofan (QCGAT) technology study final report vol. I. (1975). NASA-CR-164222. Dec. 1, 1975. pp. 1-186.
Neitzel, R.E., Hirschkron, R. and Johnston, R.P. (1976). Study of unconventional aircraft engines designed for low energy consumption. NASA-CR-135136. Dec. 1, 1976. pp. 1-153.

Neitzel, R., Lee, R., and Chamay, A.J. (1973). Engine and installation preliminary design. Jun. 1, 1973. pp. 1-333.
Parametric study of STOL short-haul transport engine cycles and operational techniques to minimize community noise impact. NASA-CR-114759. Jun. 1, 1974. pp. 1-398.
Sowers, H.D. and Coward, W.E. (1978). QCSEE over-the-wing (OTW) engine acuostic design. NASA-CR-135268. Jun. 1, 1978. pp. 1-52.
Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.
Whitaker, R. (1982). ALF 502: plugging the turbofan gap. Flight International, p. 237-241, Jan. 30, 1982.
Munt, R. (1981). Aircraft technology assessment: Progress in low emissions engine. Technical Report. May 1981. pp. 1-171.
Waters, M.H. and Schairer, E.T. (1977). Analysis of turbofan propulsion system weight and dimensions. NASA Technical Memorandum. Jan. 1977. pp. 1-65.
Avco Lycoming Divison. ALF 502L Maintenance Manual. Apr. 1981. pp. 1-118.
Type Certificate Data Sheet No. E6NE. Department of Transportation Federal Aviation Administration. Jun. 7, 2002. pp. 1-10.
Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Janes Aero-engines, Aero-engines—Turbofan. Feb. 9, 2012.
Honeywell LF502. Janes Aero-engines, Aero-engines—Turbofan. Aug. 17, 2016.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Rauch, D. (1972). Design study of an air pump and integral lift engine ALF-504 using the Lycoming 502 core. Prepare for NASA. Jul. 1972. pp. 1-182.
Dassault Falcon 900EX Easy Systems Summary. Retrieved from: http://www.smartcockpit.com/docs/F900EX-Engines.pdf pp. 1-31.
Honeywell TFE731 Pilot Tips. pp. 1-143.
Honeywell TFE731-5AR to -5BR Engine Conversion Program. Sep. 2005. pp. 1-4.
Garret TFE731 Turbofan Engine (CAT C). Chapter 79: Lubrciation System. TTFE731 Issue 2. 2010. pp. 1-24.
McArdle, J.G. (1979). Static test-stand performance of the YF-102 turbofan engine with several exhaust configurations for the quiet short-haul research aircraft (QSRA). Nasa Technical Paper. Nov. 1979. pp. 1-68.
Johnston, R.P., Hirschkron, R., Koch, C.C., Neitzel, R.E., and Vinson, P.W. (1978). Energy efficient engine: Preliminary design and integration study—final report. NASA CR-1354-44. Sep. 1978. pp. 1-401.
Johnston, R.P. and Hemsworth, M.C. (1978). Energy efficient engine preliminary design and integration studies. Jun. 1, 1978. pp. 1-28.
Awker, R.W. (1986). Evaluation of propfan propulsion applied to general aviation. NASA CR-175020. Mar. 1, 1986. pp. 1-140.
Howe, D.C. and Wynosky, T.A. (1985). Energy efficient engine program advanced turbofan nacelle definition study. NASA CR-174942. May 1, 1985. pp. 1-174.
Singh, B. (1986). Small engine component technology (SECT) study. NASA CR-175079. Mar. 1, 1986. pp. 1-102.
Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.
Anderson, R.D. (1985). Advanced Propfan Engine Technology (APET) definition study, single and counter-rotation gearbox/pitch change mechanism design. NASA CR-168115. Jul. 1, 1985. pp. 1-289.

(56) References Cited

OTHER PUBLICATIONS

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.

Gliebe, P.R., Ho, P.Y., and Mani, R. (1995). UHB engine fan and broadband noise reduction study. NASA CR-198357. Jun. 1995. pp. 1-48.

Holcombe, V. (2003). Aero-Propulsion Technology (APT) task V low noise ADP engine definition study. NASA CR-2003-212521. Oct. 1, 2003. pp. 1-73.

Sutliff, D. (2005). Rotating rake turbofan duct mode measurement system. NASA TM-2005-213828. Oct. 1, 2005. pp. 1-34.

Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.

NASA Conference Publication. (1978). CTOL transport technology. NASA-CP-2036-PT-1. Jun. 1, 1978. pp. 1-531.

Gray, D.E. (1978). Energy efficient engine preliminary design and integration studies. NASA-CP-2036-PT-1. Nov. 1978. pp. 89-110.

Kandebo, S.W. (1998). Pratt & Whitney launches geared turbofan engine. Aviation Week & Space Technology, 148(8). p. 32-4.

Kandebo, S.W. (1998). Geared-Turbofan engine design targets cost, complexity. Aviation Week & Space Technology, 148(8). p. 34-5.

Davis, D.G.M. (1973). Variable-pitch fans: Progress in Britain. Flight International. Apr. 19, 1973. pp. 615-617.

Levintan, R.M. (1975). Q-Fan demonstrator engine. Journal of Aircraft. vol. 12( 8). Aug. 1975. pp. 658-663.

Aerospace Information Report. (2008). Advanced ducted propulsor in-flight thrust determination. SAE International AIR5450. Aug. 2008. p. 1-392.

Technical Report. (1975). Quiet Clean Short-haul Experimental Engine (QCSEE) UTW fan preliminary design. NASA-CR-134842. Feb. 1, 1975. pp. 1-98.

Daggett, D.L., Brown, S.T., and Kawai, R.T. (2003). Ultra-efficient engine diameter study. NASA/CR-2003-212309. May 2003. pp. 1-52.

Technical Report. (1977). Quiet Clean Short-haul Experimental Engine (QCSEE) Under-the-Wing (UTW) final design report. NASA-CR-134847. Jun. 1, 1977. pp. 1-697.

\* cited by examiner

TURBOFAN ARRANGEMENT WITH BLADE CHANNEL VARIATIONS

CROSS-REFERENCE TO RELATED APPLICATION

The present disclosure is a continuation of U.S. patent application Ser. No. 15/045,343, filed Feb. 17, 2016, which is a continuation of U.S. patent application Ser. No. 14/699,322, filed Apr. 29, 2015 and issued as U.S. Pat. No. 9,470,093, which claims the benefit of U.S. Provisional Patent Application No. 62/134,760, filed Mar. 18, 2015.

BACKGROUND

This disclosure relates generally to a fan stage for gas turbine engines, and more particularly to a relationship between channel width relative to span for adjacent pairs of fan blades and corresponding performance and stall margin characteristics.

A turbine engine such as a gas turbine engine typically includes a fan section, a compressor section, a combustor section and a turbine section. The fan section includes a plurality of fan blades spaced circumferentially to define a plurality of channels. The fan blades compress a portion of incoming air through the channels to produce thrust and also deliver a portion of air to the compressor section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The efficiency of a gas turbine engine depends on many different factors. The fast-moving air creates flow discontinuities or shocks that result in irreversible losses. In addition to contributing to the overall efficiency of the engine, the fan module contributes significantly to the weight of the engine. As such, features that reduce the collective weight of the fan blades or the weight of the module in general contribute positively to aircraft fuel consumption.

SUMMARY

A fan section for a gas turbine engine according to an example of the present disclosure includes a rotor hub defining an axis, and an array of airfoils circumferentially spaced about the rotor hub. Each of the airfoils include pressure and suction sides between a leading edge and a trailing edge and extending in a radial direction from a 0% span position at an inner flow path location to a 100% span position at an airfoil tip, facing pressure and suction sides of adjacent airfoils defining a channel in a chordwise direction having a width between the facing pressure and suction sides at a given span position of the adjacent airfoils. The width at each pressure side location along the channel is defined as a minimum distance to a location along the suction side. The width diverges without converging along the channel for at least some of the span positions, and the width converging and diverging along the channel for at least some span positions greater than 5% span and less than half of the span positions. Each of the array of airfoils has a solidity defined by a ratio of an airfoil chord over a circumferential pitch. The solidity is between about 1.6 and about 2.5 for each of the span positions in which the width converges along the channel.

In a further embodiment of any of the foregoing embodiments, the width diverges without converging along the channel at span positions greater than about 16% span.

In a further embodiment of any of the foregoing embodiments, the width converges and diverges along the channel at span positions greater than or equal to about 10% span.

In a further embodiment of any of the foregoing embodiments, the width diverges without converging at span positions from 100% span to less than or equal to 90% span.

In a further embodiment of any of the foregoing embodiments, the solidity at the tip of each of the array of airfoils is less than or equal to about 1.2.

In a further embodiment of any of the foregoing embodiments, the width converges and diverges for less than or equal to about 20% of the span positions.

In a further embodiment of any of the foregoing embodiments, a ratio of the width to the solidity at each span position is greater than or equal to about 0.50.

In a further embodiment of any of the foregoing embodiments, the solidity at each span position is greater than or equal to about 0.8.

In a further embodiment of any of the foregoing embodiments, the array of airfoils includes 20 or fewer airfoils.

In a further embodiment of any of the foregoing embodiments, flow through the channel at span positions where the width converges and diverges along the channel corresponds to a leading edge relative mach number less than or equal to about 0.8 Mach at cruise.

In a further embodiment of any of the foregoing embodiments, a stagger angle of each of the array of airfoils relative to the axis is less than or equal to about 16 degrees at each of the span positions in which the width converges and diverges along the channel.

In a further embodiment of any of the foregoing embodiments, the width converges and diverges for less than or equal to about 20% of the span positions, and the width diverges without converging at span positions from 100% span to less than or equal to about 80% span.

In a further embodiment of any of the foregoing embodiments, the width converges along the channel at a location spaced a distance from an inlet of the channel, the distance being greater than a radius defined by the leading edge at the same span position.

In a further embodiment of any of the foregoing embodiments, the solidity at the 0% span position is greater than or equal to about 2.3.

A gas turbine engine according to an example of the present disclosure includes a combustor section arranged between a compressor section and a turbine section. A fan section has a rotor hub and an array of airfoils circumferentially spaced about the rotor hub to define a plurality of channels. Each of the array of airfoils includes pressure and suction sides and extend in a radial direction from a 0% span position at an inner flow path location to a 100% span position at an airfoil tip, facing pressure and suction sides of adjacent airfoils defining a channel in a chordwise direction having a width between the facing pressure and suction sides at a given span position of the adjacent airfoils. The width at each pressure side location along the channel is defined as a minimum distance to a location along the suction side. The width converges along the channel for at least some span positions greater than 5% span and less than half of the span positions. A stagger angle of each of the array of airfoils relative to the axis is less than or equal to about 16 degrees at span positions converging and diverging along the channel.

In a further embodiment of any of the foregoing embodiments, the width converges and diverges for less than or equal to about 20% of the span positions.

In a further embodiment of any of the foregoing embodiments, the width diverges without converging at span positions from 100% span to less than or equal to 90% span.

In a further embodiment of any of the foregoing embodiments, each of the array of airfoils has a solidity defined by a ratio of an airfoil chord over a circumferential pitch, and a ratio of the width to the solidity at each span position is greater than or equal to about 0.50.

In a further embodiment of any of the foregoing embodiments, the solidity at each span position is greater than or equal to about 0.8.

In a further embodiment of any of the foregoing embodiments, the array of airfoils includes 20 or fewer airfoils.

These and other features of this disclosure will be better understood upon reading the following specification and drawings, the following of which is a brief description.

DETAILED DESCRIPTION

Figure 1:
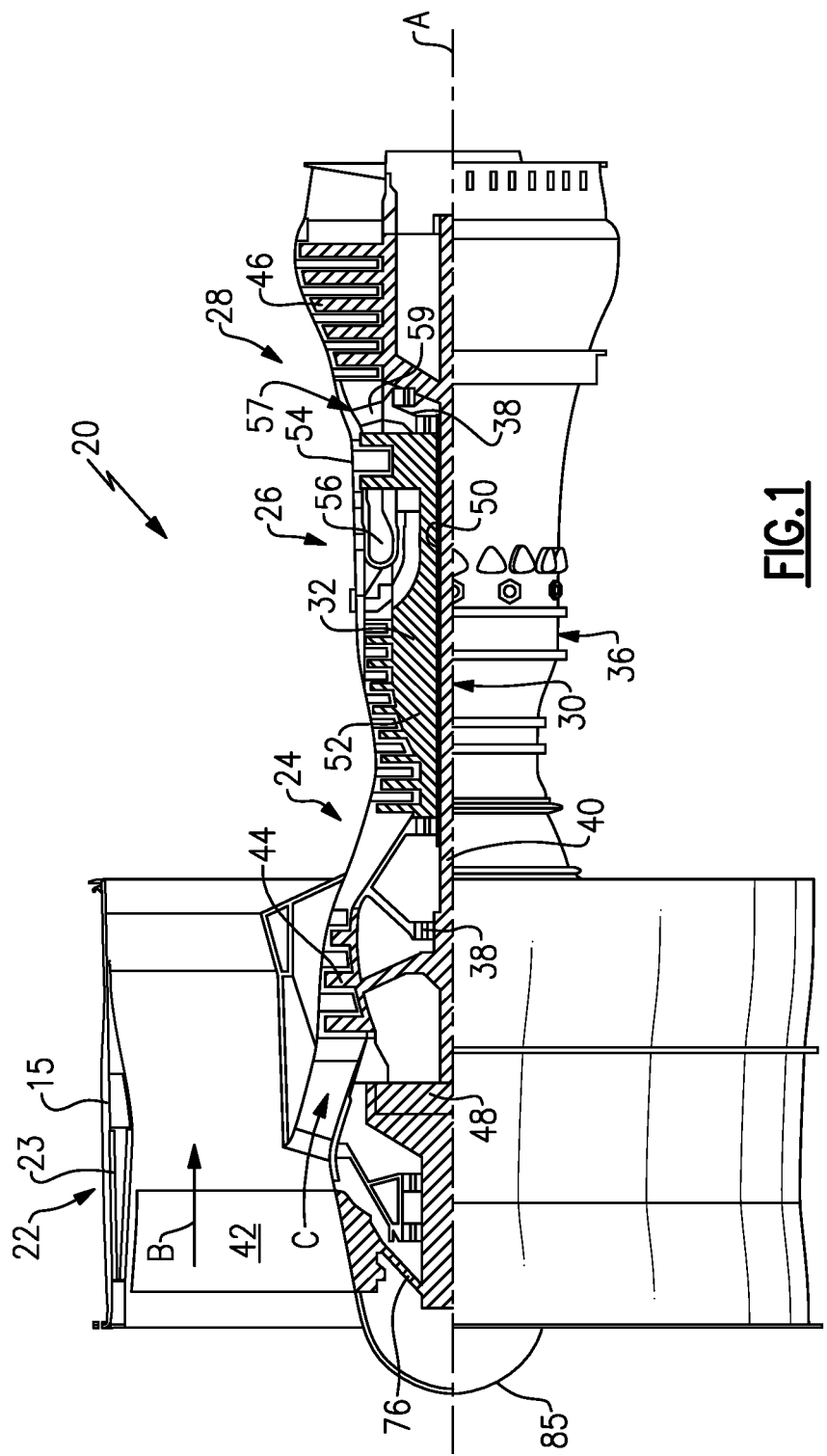
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a star gear system, a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. The engine 20 in one example is a high-bypass geared aircraft engine. In another example, the engine 20 bypass ratio is greater than about twelve (12), the geared architecture 48 has a gear reduction ratio of greater than about 2.6 and the low pressure turbine 46 has a pressure ratio that is greater than about five. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive or non-geared turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than or equal to about 1.50, with an example embodiment being less than or equal to about 1.45. "Low corrected fan tip speed" is the actual fan tip speed in ft/sec divided by an industry standard temperature correction of $[(\text{Tram }° \text{R})/(518.7° \text{R})]^{0.5}$. The "Low corrected fan tip speed" as disclosed herein according to one non-limiting embodiment is less than about 1200 ft/second, or more narrowly less than about 1150 ft/second.

In one example, the fan section 22 includes a hardwall containment system 23 arranged about the engine axis A and spaced radially from the fan blades 42. The hardwall containment system 23 is configured to contain, and absorb the impact of, a fan blade 42 separating from a fan hub 76 or a fragment thereof. In some embodiments, the hardwall containment system 23 is a hard ballistic liner applied to the nacelle or fan case 15. The hard ballistic liner can include a rigid material such as a resin impregnated fiber structure, metallic structures, or ceramic structures.

Various materials and structures of the fan case 15 and/or hardwall containment system 23 are contemplated. In some embodiments, the fan section 22 includes a composite fan case 15 made of an organic matrix composite. The organic matrix composite can include a matrix material and reinforcement fibers distributed through the matrix material. The reinforcement fibers may be discontinuous or continuous, depending upon the desired properties of the organic matrix composite, for example. The matrix material may be a thermoset polymer or a thermoplastic polymer. The reinforcement fibers may include carbon graphite, silica glass, silicon carbide, or ceramic. Given this description, one of ordinary skill in the art will recognize that other types of matrix materials and reinforcement fibers may be used. The disclosed arrangements of the composite fan case 15 reduce the overall weight of the engine, thereby improving aircraft fuel consumption.

Figure 2A:
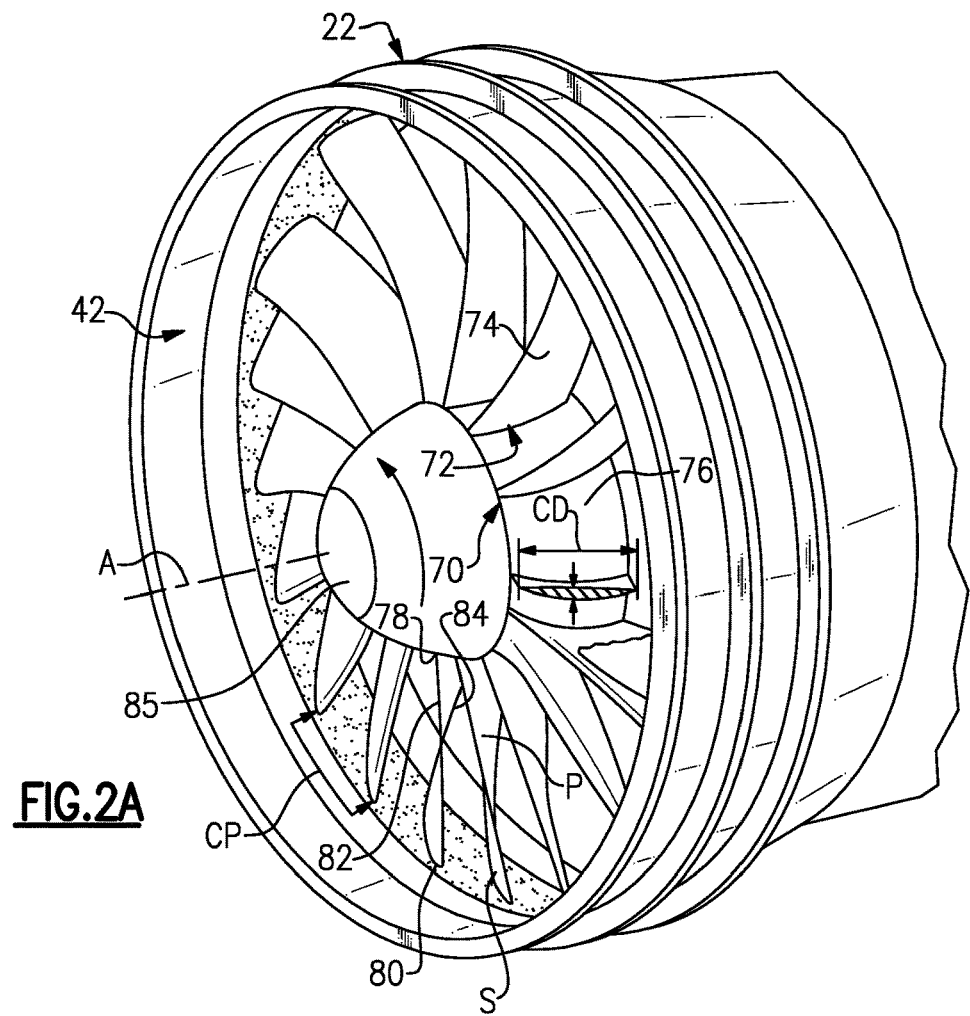
FIG. 2A is a perspective view of a fan section of the engine of FIG. 1.
Figure 2B:
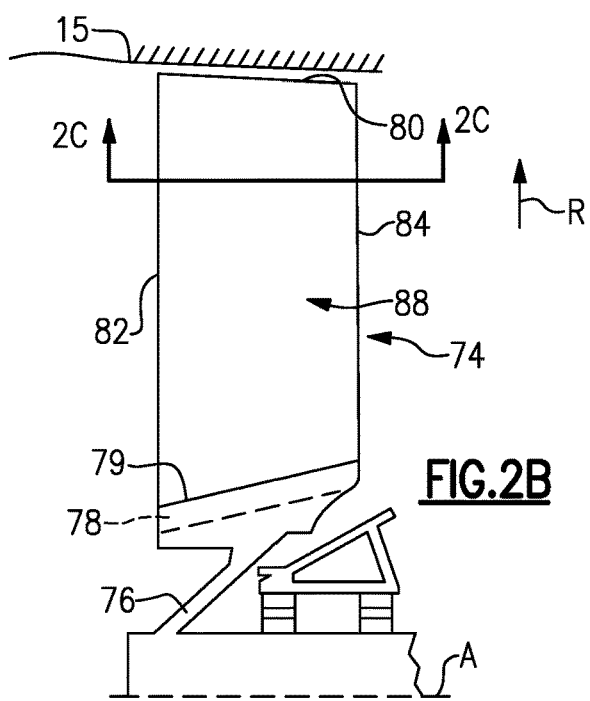
FIG. 2B is a schematic cross-sectional view of the fan section of FIG. 2A.
Figure 2C:
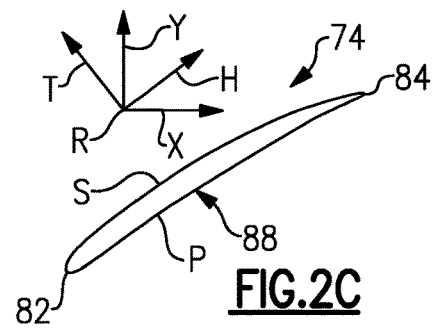
FIG. 2C is a schematic view of a cross-section of an airfoil of FIG. 2B sectioned at a particular span position and depicting directional indicators.

Referring to FIGS. 2A-2C, the fan 42 includes a rotor 70 having an array or row 72 of airfoils or blades 74 that extend circumferentially around and are supported by the fan hub 76. Any suitable number of fan blades 74 may be used in a given application. The hub 76 is rotatable about the engine axis A. The array 72 of fan blades 74 are positioned about the axis A in a circumferential or tangential direction Y. Each of the blades 74 includes an airfoil body that extends in a radial span direction R from the hub 76 between a root 78 and a tip 80, in a chord direction H (axially and circumferentially) between a leading edge 82 and a trailing edge 84 and in a thickness direction T between a pressure side P and a suction side S.

Each blade 74 has an exterior surface 88 providing a contour that extends from the leading edge 82 aftward in a chord-wise direction H to the trailing edge 84. The exterior surface 88 of the fan blade 74 generates lift based upon its geometry and directs flow along the core flow path C and bypass flow path B. The fan blade 74 may be constructed from a composite material, or an aluminum alloy or titanium alloy, or a combination of one or more of these. Abrasion-resistant coatings or other protective coatings may be applied to the fan blade 74.

A chord, represented by chord dimension (CD), is a straight line that extends between the leading edge 82 and the trailing edge 84 of the blade 74. The chord dimension (CD) may vary along the span of the blade 74. The row 72 of blades 74 also defines a circumferential pitch (CP) that is equivalent to the arc distance between the leading edges 82 or trailing edges 84 of neighboring blades 74 for a corresponding span position. The root 78 is received in a correspondingly shaped slot in the hub 76. The blade 74 extends radially outward of a platform 79, which provides the inner flow path. The platform 79 may be integral with the blade 74 or separately secured to the hub 76, for example. A spinner 85 is supported relative to the hub 76 to provide an aerodynamic inner flow path into the fan section 22.

Figure 3A:
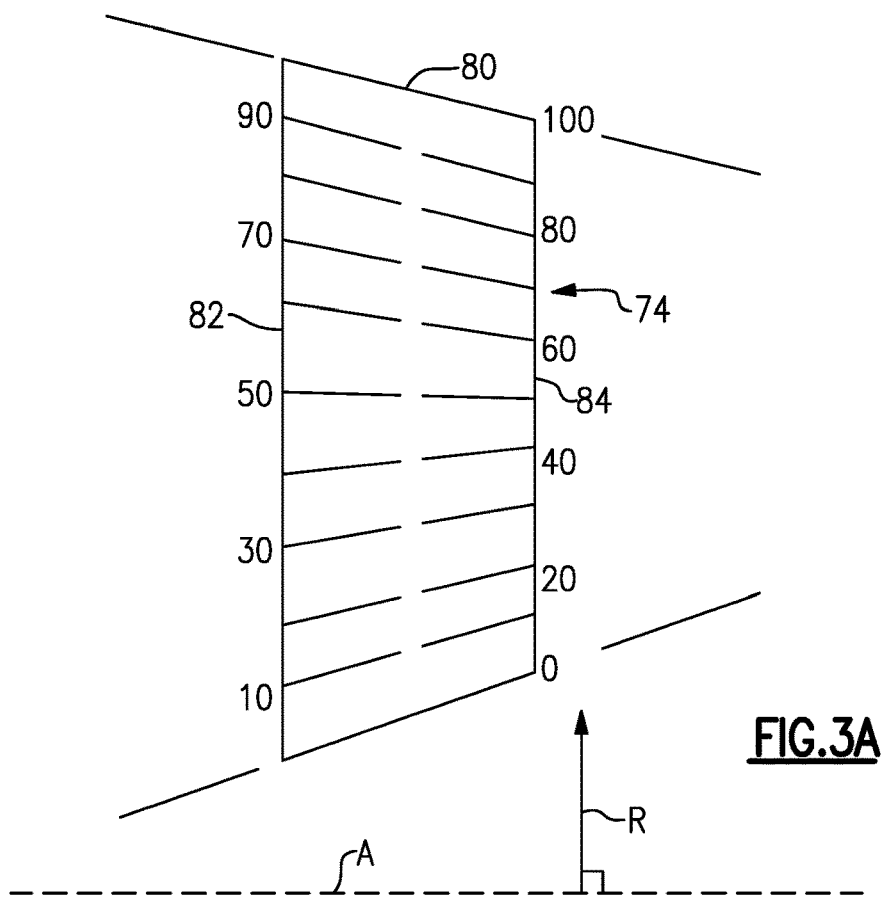
FIG. 3A is a schematic view of airfoil span positions.
Figure 3B:
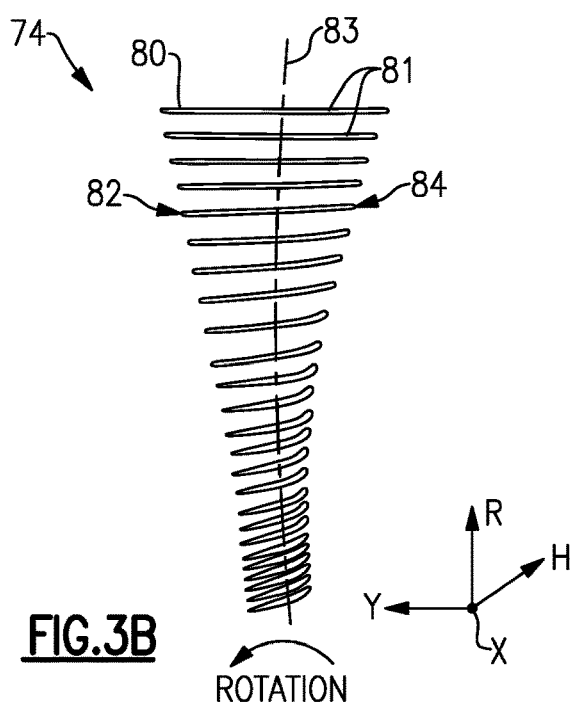
FIG. 3B is a perspective view of sections of the airfoil of FIG. 2A at various span positions.

Referring to FIGS. 3A-3B, span positions are schematically illustrated from 0% to 100% in 10% increments to define a plurality of sections 81. Each section at a given span position is provided by a conical cut that corresponds to the shape of segments the bypass flowpath B or the core flow path C, as shown by the large dashed lines (shown in FIG. 3A). In the case of a fan blade 74 with an integral platform, the 0% span position corresponds to the radially innermost location where the airfoil meets the fillet joining the airfoil to the platform 79. In the case of a fan blade 74 without an integral platform, the 0% span position corresponds to the radially innermost location where the discrete platform 79 meets the exterior surface of the airfoil (shown in FIG. 2B). A 100% span position corresponds to a section of the blade 74 at the tip 80.

In some examples, each of the blades 74 defines a non-linear stacking axis 83 (shown in FIG. 3B) in the radial direction R between the tip 80 and the inner flow path location or platform 79. For the purposes of this disclosure, "stacking axis" refers to a line connecting the centers of gravity of airfoil sections 81. In some examples, each fan blade 74 is specifically twisted about a spanwise axis in the radial direction R with a corresponding stagger angle α at each span position and is defined with specific sweep and/or dihedral angles along the airfoil 74. Airfoil geometric shapes, stacking offsets, chord profiles, stagger angles, sweep and dihedral angles, among other associated features, can be incorporated individually or collectively to improve characteristics such as aerodynamic efficiency, structural integrity, and vibration mitigation, for example.

Figure 3C:
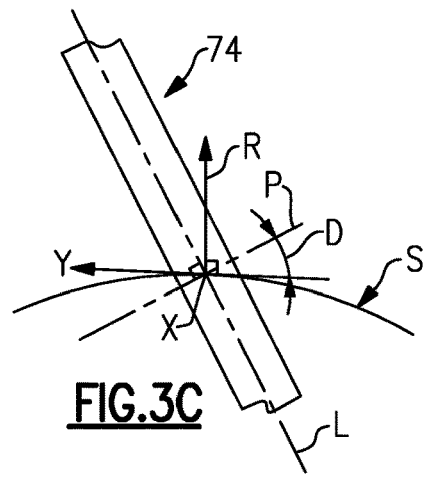
FIG. 3C is a schematic representation of a dihedral angle for an airfoil.

In some examples, the airfoil 74 defines an aerodynamic dihedral angle D (simply referred to as "dihedral") as schematically illustrated in FIG. 3C. An axisymmetric stream surface S passes through the airfoil 74 at a location that corresponds to a span location (FIG. 3A). For the sake of simplicity, the dihedral D relates to the angle at which a line L along the leading or trailing edge tilts with respect to the stream surface S. A plane P is normal to the line L and forms an angle with the tangential direction Y, providing the dihedral D. A positive dihedral D corresponds to the line tilting toward the suction side (suction side-leaning), and a negative dihedral D corresponds to the line tilting toward the pressure side (pressure side-leaning).

Figure 4:
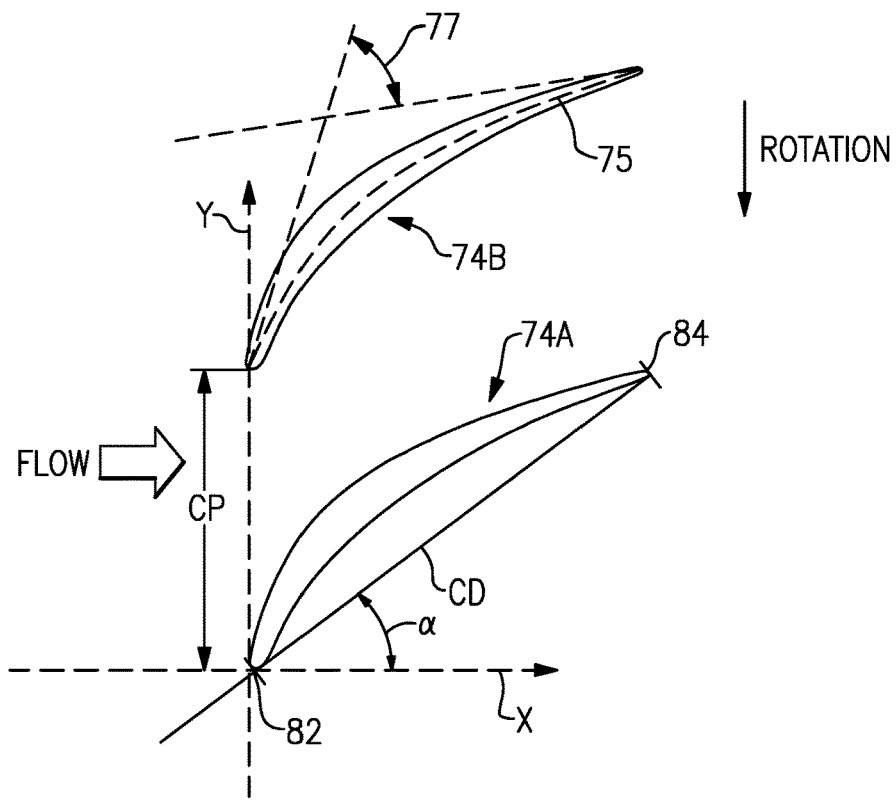
FIG. 4 is a schematic view of adjacent airfoils depicting a leading edge gap, or circumferential pitch, and a chord of the airfoil.

FIG. 4 shows an isolated view of a pair of adjacent airfoils designated as leading airfoil 74A and following airfoil 74B. As shown, each airfoil 74A, 74B is sectioned at a radial position between the root 78 and the tip 80. Chord CD, which is the length between the leading and trailing edges 82, 84, forms an angle, or stagger angle α, relative to the X-direction or plane parallel to the engine's central longitudinal axis A. The stagger angle α can vary along the span to define a twist.

As shown, each airfoil 74 has an asymmetrical cross-sectional profile characterized by a mean camber line 75 bisecting a thickness of the airfoil 74 in the chord-wise direction H and a camber angle 77 defined by a projection of the leading and trailing edges 82, 84. The camber angle 77 can differ at various span positions.

The leading edges 82, or trailing edges 84, of the adjacent airfoils 74 are separated by gap or circumferential pitch (CP) in the Y-direction, which is a function of blade count. A ratio of chord to gap, which is referred to as solidity, varies with position along the span.

The geared architecture 48 of the disclosed example permits the fan 42 to be driven by the low pressure turbine 46 through the low speed spool 30 at a lower angular speed than the low pressure turbine 46, which enables the low pressure compressor 44 to rotate at higher, more useful speeds. The solidity along the span of the airfoils 74 provides necessary fan operation in cruise at lower speeds enabled by the geared architecture 48, to enhance aerodynamic functionality and efficiency.

Figure 5:
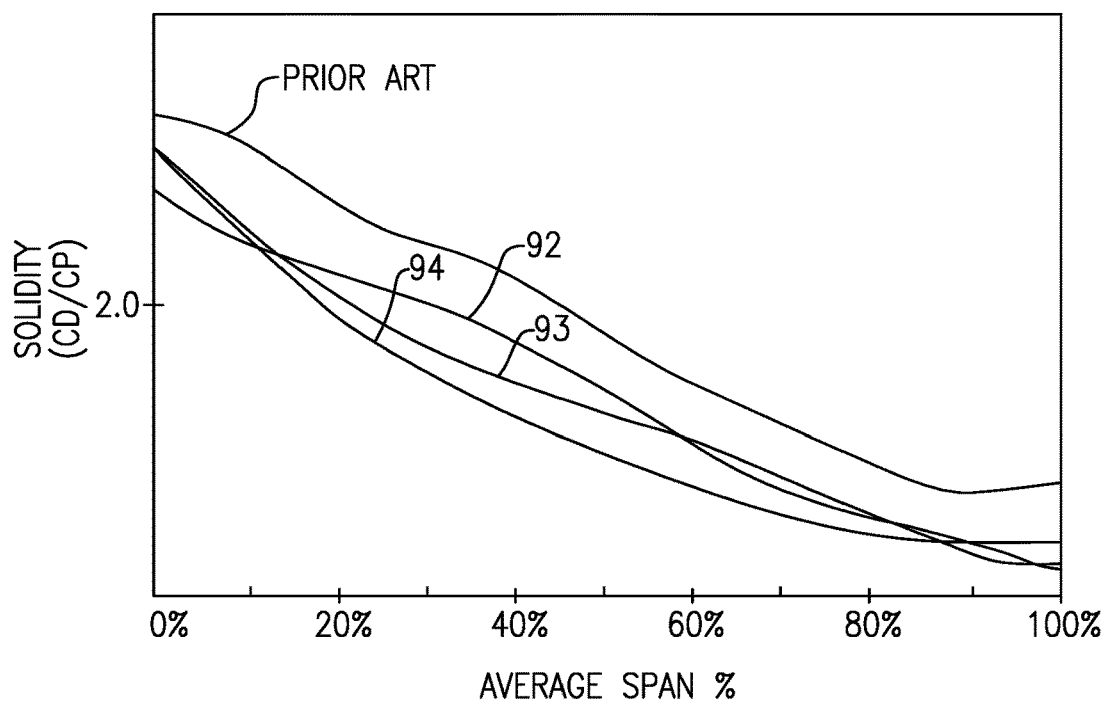
FIG. 5 graphically depicts curves for several example airfoil chord/gap ratios relative to span, including one prior art curve and several inventive curves according to this disclosure.

The airfoil 74 has a relationship between a chord/gap ratio or solidity (CD/CP) and span position. FIG. 5 illustrates the relationship between the chord/gap ratio (CD/CP) and the average span (AVERAGE SPAN %), which is the average of the radial position at the leading and trailing edges 82, 84. One prior art curve ("PRIOR ART") is illustrated as well as several example curves 92, 93, 94 corresponding to different fan arrangements. The prior art curve corresponds to a fan section having 24 blades, characterized by a relatively high solidity along the span.

Curves 92, 93, 94 correspond to fan sections with relatively low solidity. Curve 92 is characterized by a chord/gap ratio in a range of less than or equal to about 2.4 at 0% span to a chord/gap ratio greater than or equal to about 1.0 at 100% span. The example curve 92 corresponds to a fan section having 18 or fewer blades. Curve 93 is characterized by a chord/gap ratio in a range of less than or equal to about 2.5 at 0% span to a chord/gap ratio greater than or equal to about 1.0 at 100% span. The example curve 93 corresponds to a fan section having 20 or fewer blades. Curve 94 is characterized by a chord/gap ratio in a range of less than or equal to about 2.5 at 0% span to a chord/gap ratio greater than or equal to about 1.1 at 100% span. The example curve 94 corresponds to a fan section having 18 or fewer blades. In some examples, the fan section 22 has 20 or fewer fan blades, more narrowly 18 or fewer fan blades, or between 18 and 20 fan blades, utilizing any of the techniques of this disclosure.

As shown, the example curves 92, 93, 94 have a lower solidity or chord/gap ratio than the prior art curve. The chord/gap ratio of the inventive curves is less than the prior art curve due in part to a lower relative speed of the fan section than the low pressure turbine and a relatively lower pressure ratio, which is enhanced by the geared architecture 48. Low solidity fan blades, including the example fan blade arrangements illustrated by curves 92, 93, 94 corresponding to blade 74, improve the weight of the engine 20, thereby reducing fuel consumption.

Other chord/gap ratios are contemplated with the teachings of this disclosure. In some examples, the chord/gap ratio is less than or equal to about 2.5 along the average span. In another example, the chord/gap ratio is greater than or equal to about 1.0 along the average span. In one example, the chord/gap ratio is less than or equal to about 2.5, and greater than or equal to about 1.0, along the average span. In other examples, the chord/gap ratio is less than or equal to about 1.3, or less than or equal to about 1.1. In some examples, the chord/gap ratio is less than or equal to about 1.0 for at least some of the average span.

Figure 6A:
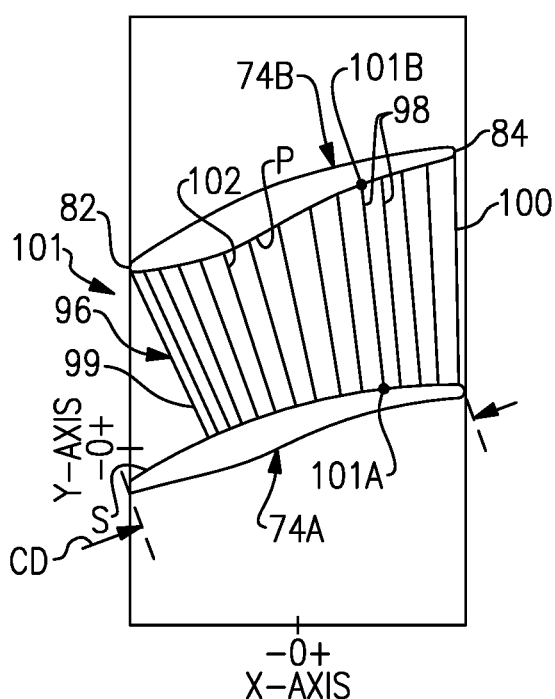
FIG. 6A is a schematic view of the adjacent airfoils depicting point pairs indicating widths along a channel between the adjacent airfoils at a first span position.

Fluid dynamic interaction between the fan blades 74 and an incoming air stream generally causes aerodynamic losses such as from shocks or viscous effects. The performance and stability characteristics of the fan section 22 depend on several factors, including the geometry and spatial arrangement of adjacent pairs of fan blades 74. Referring to FIG. 6A, a leading fan blade 74A and a following fan blade 74B are spaced apart in the circumferential direction Y to define a channel 96 extending generally in a chordwise direction from a leading edge 82 of fan blade 74B. Pressure side P of fan blade 74B and suction side S side of fan blade 74A define a plurality of segments or channel widths (O) at locations 98 along the channel 96. For the purposes of this disclosure, each channel width 98 along the channel 96 is a straight-line connected point pair extending from a point 101B on the pressure side P of the fan blade 74B to a point 101A on the suction side S of the fan blade 74A that is a minimum distance from the point on the pressure side P, and are normalized by trailing edge pitch. In this manner, a connected point pair can be defined at each location along the channel 96. The channel widths 98 vary generally in the axial direction X due to contouring of exterior surfaces 88. The channel widths 98 may vary along the span of the blade 74.

The channel 96 is provided with an inlet 99 at the leading edge 82 of fan blade 74B and an outlet 100 downstream of the inlet 99. In some examples, the width of the channel 96 diverges without converging in a chordwise direction along the channel 96 for each of the span positions. This arrangement is shown in FIG. 6E at a given span position.

In other examples, at some span positions the channel width 98 converges and diverges along the channel 96 to define a converging-diverging (C-D) diffuser 101 (shown in FIG. 6A), where 102 is labeled at a throat of the C-D diffuser 101. The throat 102 defines a minimum channel width 98 along the channel 96. The throat 102 is located downstream of a position along the pressure side P of fan blade 74B at a radius defined by the leading edge 82. Rather, the inlet 99 is characterized in part by the geometry of the leading edge 82 (best seen in FIG. 6D), whereas the throat 102 is characterized by the contouring of the pressure side P downstream of the inlet 99 (best seen in FIG. 6A). In other examples, the channel 96 has substantially the same minimum channel width 98 from the throat 102 to the outlet 100, sometimes referred to as a "converging-straight" configuration.

Various arrangements for the C-D-diffuser 101 are contemplated. The C-D diffuser 101 can extend radially from about a 0% span position to span positions greater than 5% span, greater than 10% span, greater than 16% span, or greater than about 20% span. In some examples, the channel width 98 diverges without converging at 100% span, more narrowly from 100% span to about 80% span, from 100% span to about 70% span, or from 100% span to about 50% span.

The C-D diffuser 101 can be defined along a range of span positions. In some examples, the C-D diffuser 101 is defined for about 75% or fewer of the span positions, more narrowly about 50% or fewer of the span positions, or more narrowly about 30% of the span positions. In other examples, the C-D diffuser 101 is defined for about 20% or fewer of the span positions, more narrowly about 15% or fewer of the span positions, or even more narrowly about 10% or fewer of the span positions.

The C-D diffuser 101 may be configured with various solidity or chord/gap ratios, including any of the chord/gap ratios shown in FIG. 5. In one example, the chord/gap ratio is less than or equal to about 2.2 for at least some span positions of the C-D diffuser 101. In one example, the chord/gap ratio is less than or equal to about 2.1, or less than or equal to about 2.0, for at least some span positions of the C-D diffuser 101. In another example, the chord/gap ratio is less than or equal to about 1.5 for at least some span positions of the C-D diffuser 101. In other examples, the chord/gap ratio is between about 1.6 and about 2.5, or more narrowly between about 2.0 and about 2.5, or even more narrowly between about 2.3 and about 2.5 at each span position of the C-D diffuser 101.

Figure 6B:
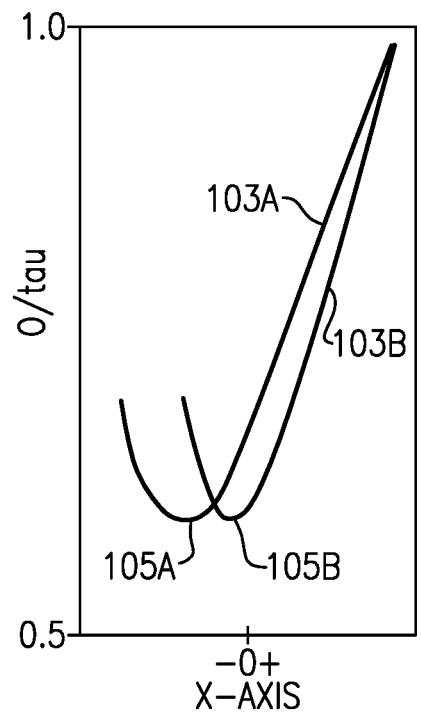
FIG. 6B graphically depicts curves for example channel widths between the adjacent airfoils of FIG. 6A normalized by trailing edge pitch.
Figure 6C:
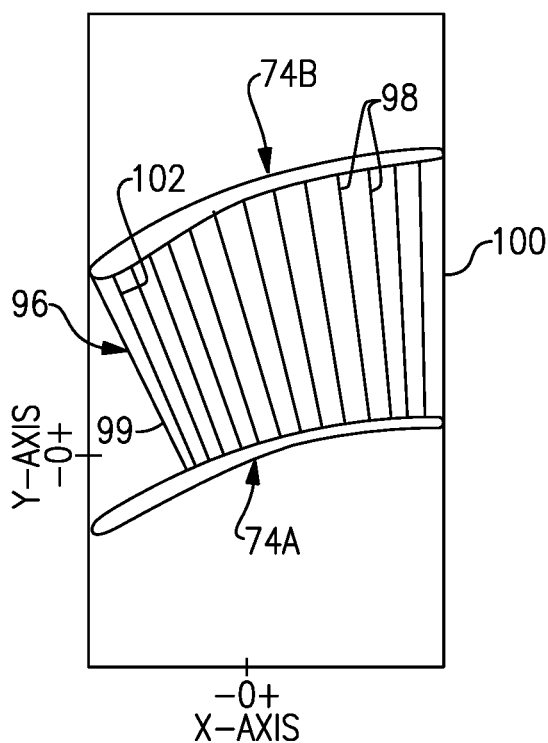
FIG. 6C is a schematic view of the adjacent airfoils of FIG. 6A depicting point pairs indicating widths along a channel between the adjacent airfoils at a second span position.
Figure 6D:
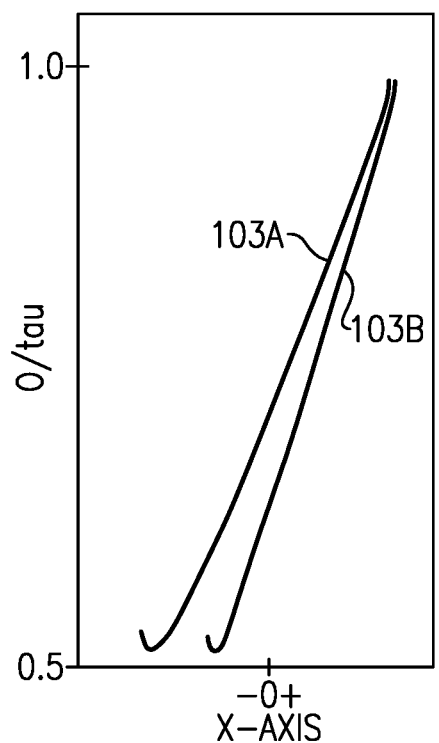
FIG. 6D graphically depicts curves for example channel widths between the adjacent airfoils of FIG. 6C normalized by trailing edge pitch.
Figure 6E:
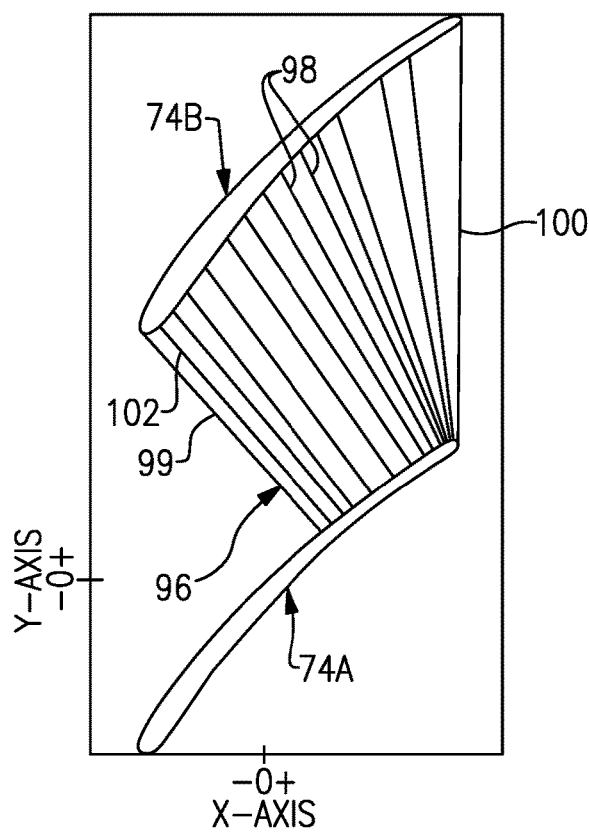
FIG. 6E is a schematic view of the adjacent airfoils of FIG. 6A depicting point pairs indicating widths along a channel between the adjacent airfoils at a third span position.
Figure 6F:
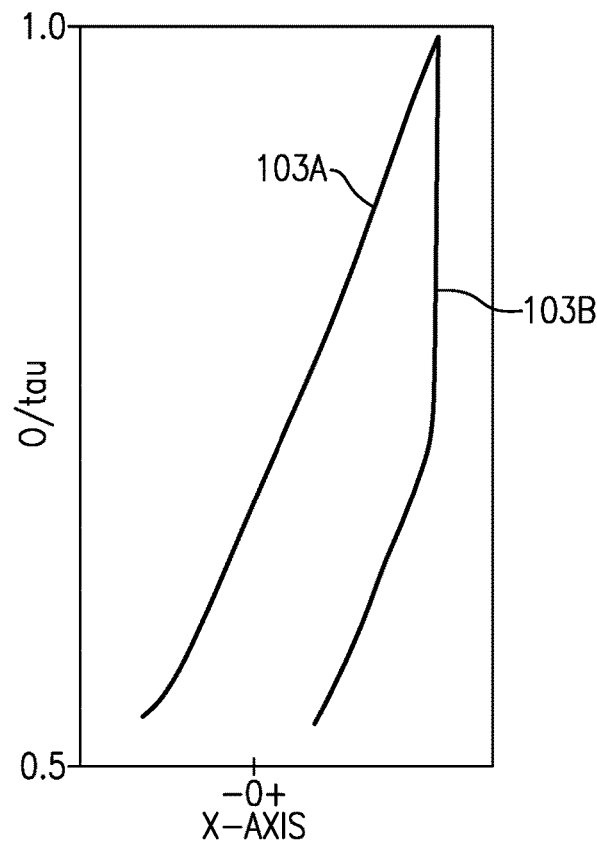
FIG. 6F graphically depicts curves for example channel widths between the adjacent airfoils of FIG. 6E normalized by trailing edge pitch.

FIG. 6B illustrates example plots 103A, 103B for a ratio between channel widths (O) and a dimension (tau) of the trailing edge circumferential pitch CP corresponding to fan blades 74A, 74B of FIG. 6A at 0% span position. The channel widths (O) correspond to positions along the channel 96, including locations 98, 99, 100 and 102. As shown, the ratio (O/tau) decreases from the inlet 99 to throat 102 with respect to the engine axis A (x-axis) and thereafter increases downstream of the throat 102 to the outlet 100 to define inflections 105A, 105B. Rather, the ratio (O/tau) at the throat 102 is the minimum value for the channel widths 98 along the channel 96. The C-D diffuser 101 is defined for less than half of the span of the channel 96, such that the channel width 98 increases or is divergent from the inlet 99 to the outlet 100 for other portions of the span, and with the ratio (O/tau) generally increasing from the inlet 99 to the outlet 100 of the channel 96 (illustrated by FIGS. 6C-6D at about 20% span, for example). Other portions of the channel 96 are divergent or increase from the inlet 99 to the outlet 100 of the channel, as illustrated by FIGS. 6E-6F at about 100% span, according to an example.

Various ratios (O/tau) are contemplated in combination with the channel arrangements of this disclosure. In some examples, the ratio (O/tau) at each span position is greater than or equal to about 0.50. In one example, the ratio (O/tau) at each span position is greater than or equal to about 0.60, and or greater than or equal to about 0.70. In another example, the ratio (O/tau) of the throat 102 at each span position of the C-D diffuser 101 is between about 0.50 and about 0.85, between about 0.73 and about 0.81, or between about 0.75 and about 0.82. In some examples, the ratio (O/tau) of the throat 102 at each span position of the C-D diffuser 101 is greater than about 0.75, or greater than or equal to about 0.8. In an example, the ratio (O/tau) of the throat 102 at each span position of the C-D diffuser 101 is between about 0.79 and about 0.83. These various arrangements further improve fluid stability through the channel 96 and improve fan blade efficiency in accordance with the teachings of this disclosure.

Figure 7:
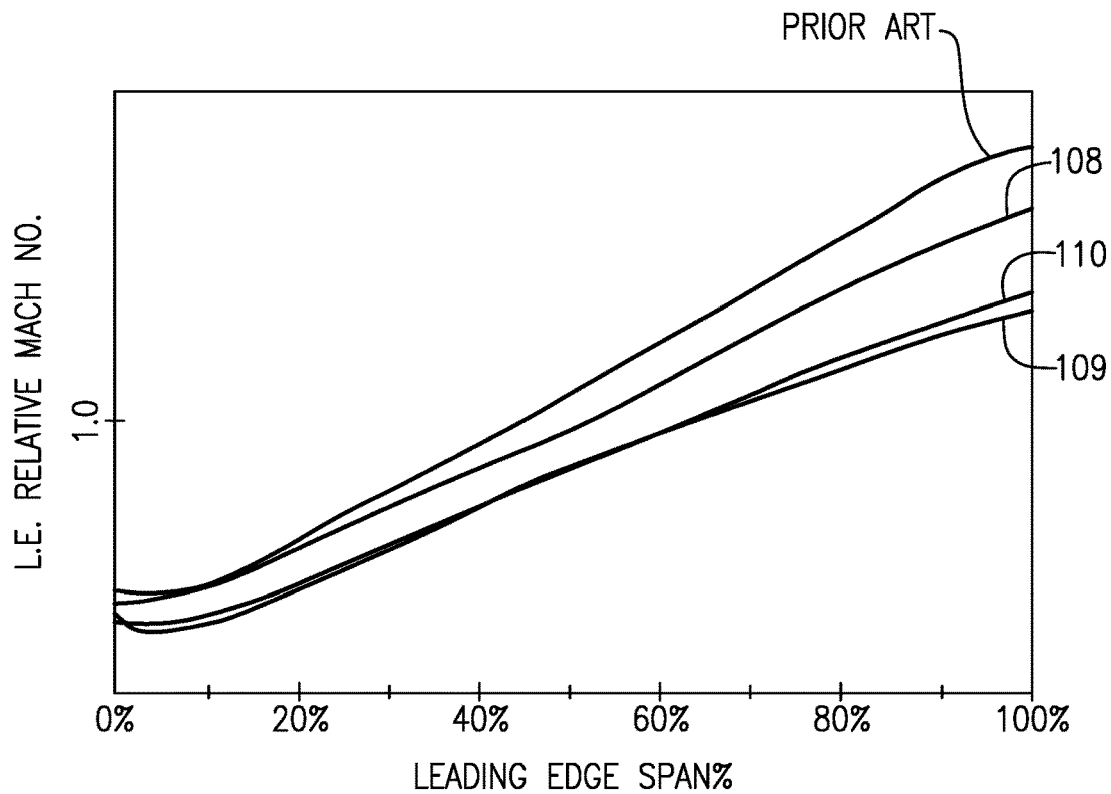
FIG. 7 graphically depicts curves for several example relative Mach numbers relative to span, including one prior art curve and several inventive curves according to this disclosure.

FIG. 7 illustrates the relationship between the Mach number of the flow (in the rotating frame of reference) through the channel 96 and the blade leading edge span (LEADING EDGE SPAN %) for various arrangements corresponding to the solidity curves of FIG. 5 and where a C-D diffuser 101 is defined for less than half of the span positions of the channel 96. One prior art curve ("PRIOR ART") is illustrated as well as several example curves 108, 109, 110. As illustrated by example curves 108, 109, 110, flow through the channel 96 corresponds to a leading edge relative mach number less than or equal to about 0.8 Mach at cruise for each span position of the C-D diffuser 101.

The prior art curve corresponds to a C-D diffuser 101 extending from a 0% span position to about 16% span position at about 0.78 Mach. The example curve 108 corresponds to a C-D diffuser 101 extending from about a 0% span position to about a 14% span position at about 0.78 Mach. The example curve 109 corresponds to a C-D diffuser 101 extending from about a 0% span position to about a 13% span position at about 0.71 Mach. The example curve 110 corresponds to a C-D diffuser 101 extending from about a 0% span position to about a 15% span position at about 0.73 Mach. The relatively low solidity arrangements corresponding to example curves 108, 109, 110 further reduces engine weight, thereby further reducing fuel consumption.

Figure 8:
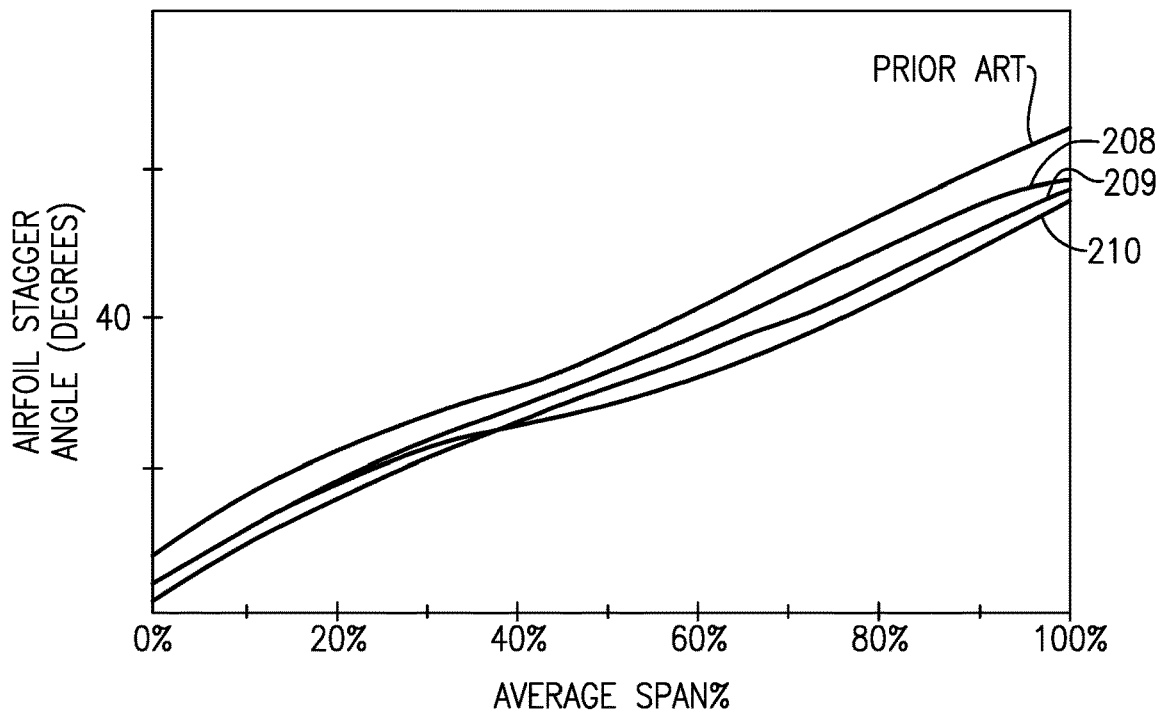
FIG. 8 graphically depicts curves for several example airfoil stagger angles (a) relative to span, including one prior art curve and several inventive curves according to this disclosure.

FIG. 8 illustrates a relationship between airfoil stagger angle (α) and the average span (AVERAGE SPAN %) for various arrangements of blades 74 corresponding to the solidity curves of FIG. 5 and the relative Mach number curves of FIG. 7. The stagger angle (a) values in FIG. 8 are given relative to an axial direction, or plane parallel to the engine longitudinal axis A. One prior art curve ("PRIOR ART") is illustrated as well as several example curves 108, 109, 110.

The prior art curve corresponds to a blade having an airfoil stagger angle (α) of about 18 degrees at about 16% span position. The example curve 208 corresponds to a blade 74 having an airfoil stagger angle (α) of about 12 degrees at about a 14% span position. The example curve 209 corresponds to a blade 74 having an airfoil stagger angle (α) of about 11 degrees at about a 13% span position. The example curve 210 corresponds to a blade 74 having an airfoil stagger angle (α) of about 13 degrees at about a 15% span. In some examples, the airfoil stagger angles (α) of the curves shown in FIG. 8 at these given span positions correspond to a location where the diffuser 101 transitions from a converging-diverging configuration to a divergent without converging arrangement as discussed above.

Other airfoil stagger angles (α) are contemplated. In some examples, the C-D diffuser 101 corresponds to an airfoil stagger angle (α) equal to or less than about 15 degrees along each span position. In other examples, the C-D diffuser 101 corresponds to an airfoil stagger angle (α) equal to or less than about 10 degrees along each span position. In another example, the C-D diffuser 101 corresponds to an airfoil stagger angle (α) less than or equal to about 15 degrees, and greater than or equal to about 10 degrees, for each span position. In some examples, the airfoil stagger angle (α) is less than or equal to about 60 degrees for each span position. In one example, the airfoil stagger angle (α) is less than or equal to about 55 degrees for each span position. It should be appreciated that the various airfoil stagger angles (α) can be utilized with any of the solidities and relative Mach numbers disclosed herein to improve airfoil efficiency.

Engines made with the disclosed architecture, and including fan section arrangements as set forth in this application, and with modifications coming from the scope of the claims in this application, thus provide very high efficient operation, relatively high stall margins, and are compact and lightweight relative to their thrust capability. Two-spool and three-spool direct drive engine architectures can also benefit from the teachings herein.

It should be understood that relative positional terms such as "forward," "aft," "upper," "lower," "above," "below," and the like are with reference to the normal operational attitude of the vehicle and should not be considered otherwise limiting.

While this invention has been disclosed with reference to one embodiment, it should be understood that certain modifications would come within the scope of this invention. For that reason, the following claims should be studied to determine the true scope and content of this invention.

What is claimed is:

1. A gas turbine engine comprising:
    a fan section having a fan including a rotor hub rotatable about an engine longitudinal axis and an array of fan blades circumferentially spaced about the rotor hub, wherein the array of fan blades deliver air to a bypass duct;
    a geared architecture;
    a compressor section including a low pressure compressor and a high pressure compressor;
    a turbine section including a low pressure turbine and a high pressure turbine, wherein the low pressure turbine drives the fan through the geared architecture;
    a combustor section arranged between the compressor section and the turbine section;
    wherein each fan blade of the array of fan blades includes pressure and suction sides and extending in a radial direction from a 0% span position at an inner flow path location to a 100% span position at an airfoil tip, adjacent fan blades in the array of fan blades including a first fan blade and a second fan blade, a facing pressure side of the first fan blade and a facing suction side of the second fan blade defining a channel having a width that varies in a chordwise direction between the facing pressure and suction sides at a given span position of the first and second fan blades;
    wherein the width at each pressure side location of the first fan blade along the channel is defined as a minimum distance from the respective pressure side location to a location along the suction side of the second fan blade, the width of the channel converging in the chordwise direction to establish a throat for at least some span positions greater than 5% span and less than half of the span positions, the throat established at a location spaced a distance from an inlet of the channel, the distance is greater than a radius defined by a leading edge of the first fan blade at the same span position, and the inlet extends along the width of the channel associated with the leading edge of the first fan blade; and
    wherein a stagger angle of each fan blade of the array of fan blades relative to the engine longitudinal axis is less than or equal to 15 degrees at span positions in which the channel converges and diverges.

2. The gas turbine engine as set forth in claim 1, wherein the fan section includes a fan case surrounding the array of fan blades, and the fan case defines the bypass duct.

3. The gas turbine engine as set forth in claim 2, wherein the array of fan blades includes 20 or fewer fan blades.

4. The gas turbine engine as set forth in claim 3, further comprising a bypass ratio defined as the volume of air passing into the bypass duct compared to the volume of air passing into the compressor section, wherein the bypass ratio is greater than 10.

5. The gas turbine engine as set forth in claim 4, wherein the fan section includes a fan pressure ratio of less than or equal to 1.45 across the fan blades alone.

6. The gas turbine engine as set forth in claim 5, wherein the channel converges and diverges at span positions greater than or equal to 10% span.

7. The gas turbine engine as set forth in claim 6, wherein the channel diverges without converging at span positions from 100% span to less than or equal to 90% span.

8. The gas turbine engine as set forth in claim 7, wherein the channel diverges without converging at span positions greater than 16% span.

9. The gas turbine engine as set forth in claim 8, wherein the channel diverges without converging at span positions from 100% span to less than or equal to 70% span.

10. The gas turbine engine as set forth in claim 9, wherein the channel converges and diverges for less than or equal to 20% of the span positions.

11. The gas turbine engine as set forth in claim 10, wherein the array of fan blades has a solidity defined by a ratio of an airfoil chord over a circumferential pitch, the solidity being between 1.6 and 2.5 for each of the span positions in which the channel converges.

12. The gas turbine engine as set forth in claim 11, wherein the array of fan blades includes 18 or fewer fan blades.

13. The gas turbine engine as set forth in claim 12, wherein the fan section has only a single fan stage comprising the fan.

14. The gas turbine engine as set forth in claim 13, wherein the low pressure turbine includes an inlet, an outlet, and a low pressure turbine pressure ratio greater than 5, wherein the low pressure turbine pressure ratio is a ratio of a pressure measured prior to the inlet as related to a pressure at the outlet prior to any exhaust nozzle.

15. The gas turbine engine as set forth in claim 14, wherein the geared architecture defines a gear reduction ratio of greater than 2.3, the bypass ratio is greater than 12, the low pressure compressor comprises a plurality of compressor stages, the high pressure turbine is a two stage turbine, the low pressure turbine drives the low pressure compressor, and the high pressure turbine drives the high pressure compressor.

16. The gas turbine engine as set forth in claim 15, wherein:
the solidity is less than or equal to 2.0 for at least some span positions in which the channel converges;
a ratio of the width to the solidity at each span position is between 0.50 and 0.85; and
flow through the channel at span positions where the channel converges and diverges corresponds to a leading edge relative mach number less than or equal to 0.8 Mach at cruise.

17. A gas turbine engine comprising:
a fan section having a fan including a rotor hub rotatable about an engine longitudinal axis and an array of fan blades circumferentially spaced about the rotor hub, wherein the array of fan blades deliver air to a bypass duct;
a geared architecture;
a compressor section including a low pressure compressor and a high pressure compressor;
a turbine section including a low pressure turbine and a high pressure turbine, wherein the low pressure turbine drives the fan through the geared architecture;
a combustor section arranged between the compressor section and the turbine section;
wherein each fan blade of the array of fan blades includes pressure and suction sides and extending in a radial direction from a 0% span position at an inner flow path location to a 100% span position at an airfoil tip, adjacent fan blades in the array of fan blades including a first fan blade and a second fan blade, a facing pressure side of the first fan blade and a facing suction side of the second fan blade defining a channel having a width that varies in a chordwise direction between the facing pressure and suction sides at a given span position of the first and second fan blades; and
wherein the width at each pressure side location of the first fan blade along the channel is defined as a minimum distance from the respective pressure side location to a location along the suction side of the second fan blade, the width of the channel converging in the chordwise direction to establish a throat for at least some span positions greater than 5% span and less than half of the span positions, the throat established at a location spaced a distance from an inlet of the channel, the distance is greater than a radius defined by a leading edge of the first fan blade at the same span position, and the inlet extends along the width of the channel associated with the leading edge of the first fan blade; and
wherein the array of fan blades has a solidity defined by a ratio of an airfoil chord over a circumferential pitch, the solidity being between 1.6 and 2.5 for each of the span positions in which the channel converges.

18. The gas turbine engine as set forth in claim 17, further comprising:
a bypass ratio defined as the volume of air passing into the bypass duct compared to the volume of air passing into the compressor section, wherein the bypass ratio is greater than 10;
wherein the fan section includes a fan case surrounding the array of fan blades, and the fan case defines the bypass duct;
wherein the fan section includes a fan pressure ratio of less than or equal to 1.45 across the fan blades alone; and
wherein the array of fan blades includes 20 or fewer fan blades.

19. The gas turbine engine as set forth in claim 18, wherein the channel diverges without converging at span positions from 100% span to less than or equal to 90% span.

20. The gas turbine engine as set forth in claim 19, wherein the channel converges and diverges along the channel at span positions greater than or equal to 10% span.

21. The gas turbine engine as set forth in claim 20, wherein the array of fan blades includes 18 or fewer fan blades.

22. The gas turbine engine as set forth in claim 21, wherein the channel diverges without converging at span positions greater than 16% span.

23. The gas turbine engine as set forth in claim 22, wherein the channel diverges without converging at span positions from 100% span to less than or equal to 80% span.

24. The gas turbine engine as set forth in claim 23, wherein the geared architecture is a planetary gear system.

25. The gas turbine engine as set forth in claim 24, wherein the bypass ratio is greater than 12, the low pressure compressor comprises a plurality of compressor stages, the high pressure turbine is a two stage turbine, the low pressure turbine drives the low pressure compressor, and the high pressure turbine drives the high pressure compressor.

26. The gas turbine engine as set forth in claim 25, wherein a stagger angle of each of the array of fan blades relative to the engine longitudinal axis is less than or equal to 15 degrees at each of the span positions in which the channel converges and diverges.

27. The gas turbine engine as set forth in claim 26, wherein flow through the channel at span positions where the channel converges and diverges corresponds to a leading edge relative mach number less than or equal to 0.8 Mach at cruise.

28. The gas turbine engine as set forth in claim 27, wherein the channel converges and diverges for less than or equal to 15% of the span positions.

29. The gas turbine engine as set forth in claim 28, wherein a ratio of the width to the solidity at each span position is between 0.50 and 0.85.

30. The gas turbine engine as set forth in claim 29, wherein the solidity is less than or equal to 2.0 for at least some span positions in which the channel converges.

* * * * *